(12) United States Patent
Miara et al.

(10) Patent No.: US 10,930,927 B2
(45) Date of Patent: Feb. 23, 2021

(54) POSITIVE ELECTRODE ACTIVE MATERIAL, METHODS FOR THE MANUFACTURE THEREOF, AND ELECTROCHEMICAL CELL COMPRISING THE POSITIVE ELECTRODE ACTIVE MATERIAL

(71) Applicants: Samsung Electronics Co., Ltd., Gyeonggi-do (KR); The Regents of the University of California, Oakland, CA (US); Massachusetts Institute of Technology, Cambridge, MA (US)

(72) Inventors: Lincoln Miara, Lincoln, MA (US); Yan Wang, Brookline, MA (US); Tomoyuki Tsujimura, Kanagawa (JP); Yuichi Aihara, Osaka (JP); William Richards, Osaka (JP); Gerbrand Ceder, Orinda, CA (US)

(73) Assignees: SAMSUNG ELECTRONICS CO., LTD., Gyeonggi-do (KR); THE REGENTS OF THE UNIVERSITY OF CALIFORNIA, Oakland, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 266 days.

(21) Appl. No.: 15/970,144

(22) Filed: May 3, 2018

(65) Prior Publication Data
US 2019/0140265 A1    May 9, 2019

Related U.S. Application Data

(60) Provisional application No. 62/583,296, filed on Nov. 8, 2017.

(51) Int. Cl.
*H01M 4/36* (2006.01)
*H01M 4/505* (2010.01)
(Continued)

(52) U.S. Cl.
CPC ............. *H01M 4/366* (2013.01); *C01B 25/45* (2013.01); *C01B 35/121* (2013.01); *C01D 15/04* (2013.01);
(Continued)

(58) Field of Classification Search
CPC .... H01M 4/366; H01M 4/505; H01M 4/5825; H01M 4/582; H01M 4/587; H01M 4/382;
(Continued)

(56) References Cited

U.S. PATENT DOCUMENTS 9,362,562 B2   6/2016 Armand et al.
2009/0081554 A1   3/2009 Takada et al.
(Continued)

FOREIGN PATENT DOCUMENTS

KR    20150128153    11/2015

*Primary Examiner* — Laura Weiner
(74) *Attorney, Agent, or Firm* — Cantor Colburn LLP

(57) ABSTRACT

A positive electrode active material includes a core and a coating disposed on at least a portion of a surface of the core. The core includes a lithium metal oxide, a lithium metal phosphate, or a combination thereof. The coating includes a compound according to the formula $Li_m M^1_n X_p$, wherein $M^1$, X, m, n and p are as defined herein. Also, an electrochemical cell including the positive electrode active material, and methods for the manufacture of the positive electrode active material and the electrochemical cell.

14 Claims, 5 Drawing Sheets

(51) Int. Cl.
  *H01M 4/58* (2010.01)
  *H01M 4/587* (2010.01)
  *H01M 4/38* (2006.01)
  *H01M 10/0525* (2010.01)
  *H01M 10/0562* (2010.01)
  *H01M 10/058* (2010.01)
  *C01G 53/00* (2006.01)
  *C01B 25/45* (2006.01)
  *C01B 35/12* (2006.01)
  *C01D 15/04* (2006.01)
  *H01M 4/525* (2010.01)
  *H01M 4/131* (2010.01)
  *H01M 4/02* (2006.01)

(52) U.S. Cl.
  CPC ............ *C01G 53/50* (2013.01); *H01M 4/131* (2013.01); *H01M 4/382* (2013.01); *H01M 4/505* (2013.01); *H01M 4/525* (2013.01); *H01M 4/582* (2013.01); *H01M 4/587* (2013.01); *H01M 4/5825* (2013.01); *H01M 10/058* (2013.01); *H01M 10/0525* (2013.01); *H01M 10/0562* (2013.01); *H01M 2004/028* (2013.01); *H01M 2300/0068* (2013.01)

(58) Field of Classification Search
  CPC ............ H01M 4/525; H01M 10/0562; H01M 10/0525; H01M 10/058; H01M 2004/028; H01M 2300/0068; C01B 25/45; C01B 35/121; C01D 15/04; C01G 53/50; C01P 2004/51; C01P 2004/61; C01P 2004/86; C01P 2006/40
  See application file for complete search history.

(56) References Cited

U.S. PATENT DOCUMENTS

| | | |
|---|---|---|
| 2010/0173197 A1* | 7/2010 | Li .................. H01M 4/366 429/220 |
| 2011/0045348 A1 | 2/2011 | Kubo et al. |
| 2012/0052396 A1 | 3/2012 | Tsuchida et al. |
| 2013/0059209 A1 | 3/2013 | Ota et al. |
| 2014/0065298 A1 | 3/2014 | Yanagisawa et al. |
| 2015/0093651 A1 | 4/2015 | Aihara et al. |
| 2017/0338473 A1* | 11/2017 | Cho .................. H01M 4/366 |

* cited by examiner

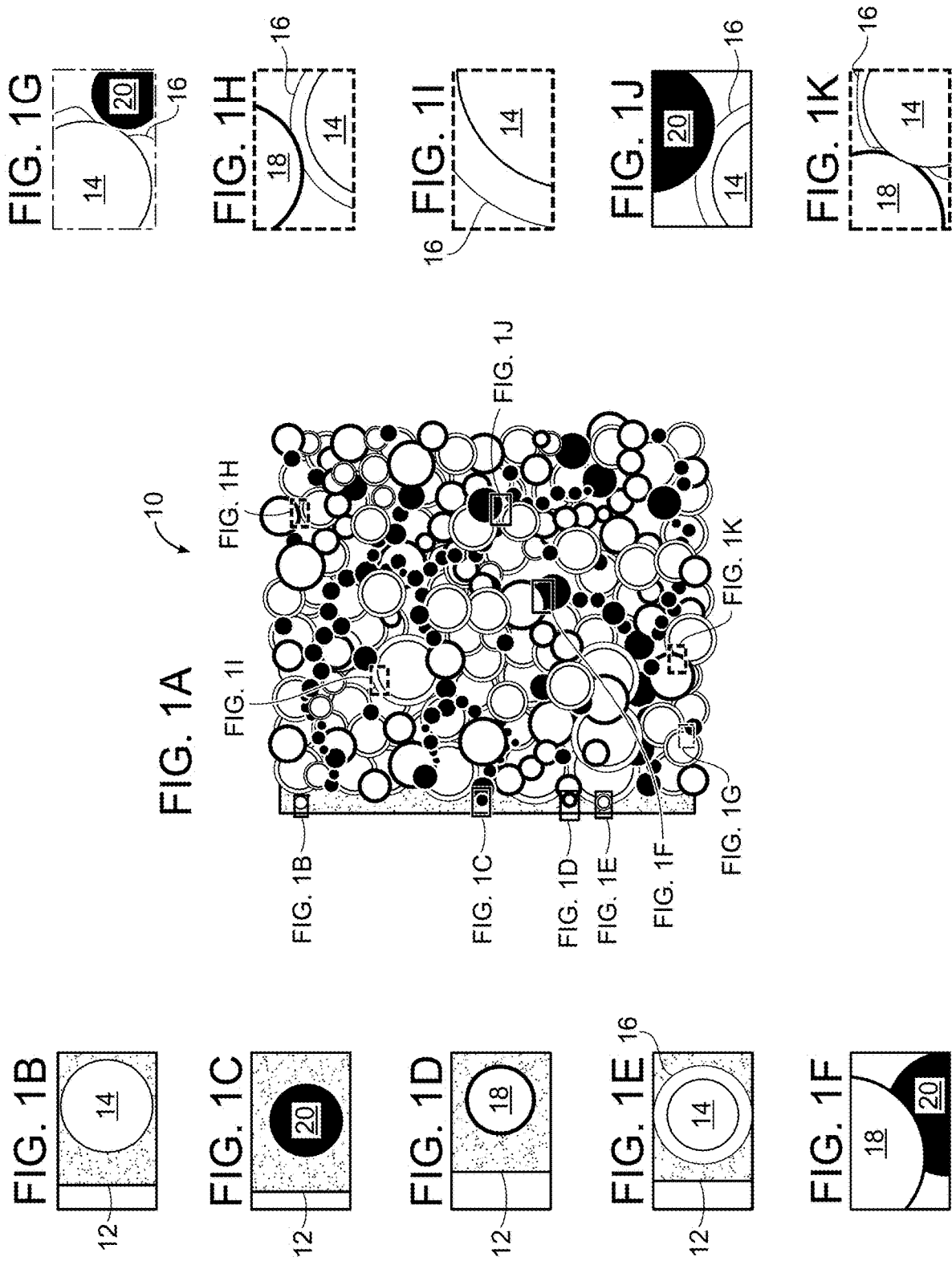

POSITIVE ELECTRODE ACTIVE MATERIAL, METHODS FOR THE MANUFACTURE THEREOF, AND ELECTROCHEMICAL CELL COMPRISING THE POSITIVE ELECTRODE ACTIVE MATERIAL

CROSS REFERENCE TO RELATED APPLICATIONS

This application claims the benefit, under 35 U.S.C. § 119(e), of U.S. Provisional Patent Application Ser. No. 62/583,296, filed on Nov. 8, 2017, the content of which is incorporated herein by reference in its entirety.

BACKGROUND

Present lithium (Li)-ion batteries suffer from undesirable reactions between the electrolyte and the positive electrode. Solid-state Li-ion batteries face similar technical challenges, as the cathode and the solid electrolyte may also react, often forming an insulating layer from the decomposed electrolyte, which can impede normal operation of the battery. To improve the performance of the positive electrode active material, coatings have been proposed in order to mitigate the effects of such undesirable reactions.

Accordingly, there is a need in the art for an improved positive electrode active material and an electrochemical cell including the positive electrode active material.

SUMMARY

A positive electrode active material comprises a core comprising a lithium metal oxide, a lithium metal phosphate, or a combination thereof, and a coating disposed on at least a portion of a surface of the core, wherein the coating comprises a compound according to Formula (I)

$$Li_m M^1{}_n X_p \qquad (I)$$

wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof, and $0<m\leq6$, $0\leq n\leq1$, and $0<p\leq7$; provided that when n is 0, X is $B_7O_{12}$, $B_{11}O_{18}$, or $P(HO_2)_2$.

A positive electrode active material comprises a core comprising a lithium metal oxide, a lithium metal phosphate, or a combination thereof, and a coating disposed on at least a portion of a surface of the core, wherein the coating comprises $LiP(HO_2)_2$.

A method for the manufacture of a positive electrode active material comprises combining a lithium precursor, a metal precursor, a solvent, and at least one of a phosphorous oxide, a borate, a fluoride, and a chloride to form a mixture, contacting the mixture with a core comprising a lithium metal oxide, a lithium metal phosphate, or a combination thereof, and heating the mixture and the core to obtain a positive electrode active material precursor comprising a coating precursor on at least a portion of a surface of the core.

An electrochemical cell comprises a positive electrode comprising a positive electrode active material comprising a core comprising a lithium metal oxide, a lithium metal phosphate, or a combination thereof, and a coating disposed on at least a portion of a surface of the core, wherein the coating comprises a compound according to Formula (I)

$$Li_m M^1{}_n X_p \qquad (I)$$

wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof, and $0<m\leq6$, $0\leq n\leq1$, and $0<p\leq7$; provided that when n is 0, X is $B_7O_{12}$, $B_{11}O_{18}$, or $P(HO_2)_2$, a negative electrode; and an electrolyte between the positive electrode and the negative electrode.

An electrochemical cell comprises a positive electrode comprising a positive electrode active material comprising a core comprising a lithium metal oxide, a lithium metal phosphate, or a combination thereof, and a coating disposed on at least a portion of a surface of the core, wherein the coating comprises $LiP(HO_2)_2$.

A method for the manufacture of an electrochemical cell comprises providing a positive electrode comprising a positive electrode active material comprising a core comprising a lithium metal oxide, a lithium metal phosphate, or a combination thereof, and a coating disposed on at least a portion of a surface of the core, wherein the coating comprises a compound according to Formula (I)

$$Li_m M^1{}_n X_p \qquad (I)$$

wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof, and $0<m\leq6$, $0\leq n\leq1$, and $0<p\leq7$; provided that when n is 0, X is $B_7O_{12}$, $B_{11}O_{18}$, or $P(HO_2)_2$, providing a negative electrode, and disposing an electrolyte between the positive electrode and the negative electrode to manufacture the electrochemical cell.

The above described and other features are exemplified by the following figures and detailed description.

BRIEF DESCRIPTION OF THE DRAWINGS

The following figures are exemplary embodiments wherein the like elements are numbered alike.

FIG. 1A is a schematic cross-sectional view of an embodiment of a coated positive electrode.

FIG. 1B is an enlarged view of a portion of an embodiment of a coated positive electrode.

FIG. 1C is an enlarged view of a portion of an embodiment of a coated positive electrode.

FIG. 1D is an enlarged view of a portion of an embodiment of a coated positive electrode.

FIG. 1E is an enlarged view of a portion of an embodiment of a coated positive electrode.

FIG. 1F is an enlarged view of a portion of an embodiment of a coated positive electrode.

FIG. 1G is an enlarged view of a portion of an embodiment of a coated positive electrode.

FIG. 1H is an enlarged view of a portion of an embodiment of a coated positive electrode.

FIG. 1I is an enlarged view of a portion of an embodiment of a coated positive electrode.

FIG. 1J is an enlarged view of a portion of an embodiment of a coated positive electrode.

FIG. 1K is an enlarged view of a portion of an embodiment of a coated positive electrode.

DETAILED DESCRIPTION

Figure 2A:
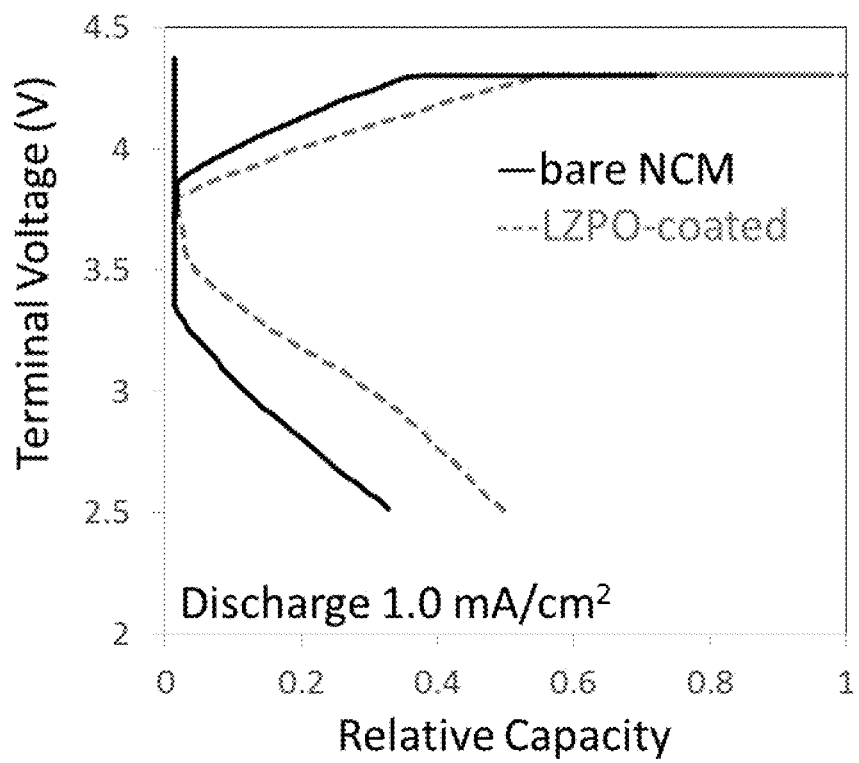
FIG. 2A is a graph of voltage (V vs. Li/Li$^+$) vs. capacity (milliampere-hours per gram, mAh/g) for an electrochemical cell having a positive electrode active material coated with LiZnPO$_4$ and an electrochemical cell having an uncoated positive electrode active material.

The present inventors have discovered a new coating material that can be used to provide an improved positive electrode active material for a lithium battery. Specifically, the disclosed coating material provides an improved combination of lithium ion conductivity, resistance to electronic conductivity, and stability over the entire operating voltage range.

A schematic illustration of an embodiment of a coated positive electrode, and some of the various possible interfacial contacts that can occur, is shown in FIG. 1A. The coated positive electrode 10 includes a current collector 12, a positive electrode active material 14, the positive electrode active material 14 comprising a coating 16, a solid electrolyte 18, and a conductive agent 20. FIG. 1B-1K are enlarged views of various portions of the coated positive electrode, illustrating different interfaces that can form as the various components contact one another. As shown in FIGS. 1H, 1I, and 1K, interfaces that can transfer lithium ions include those between the solid electrolyte 18 and the coating 16, between the coating 16 and the positive electrode active material 14, and between the solid electrolyte 18 and the positive electrode active material 14, e.g., via an imperfect coating. Interfaces that can transfer electrons include those between the positive electrode active material 14 and a conductive agent 20, e.g., carbon black as shown in FIG. 1G. While not wanting to be bound by theory, it is understood that degradation of the positive electrode can occur when electrons are transferred to the solid electrolyte and/or when lithium or electrons cannot transport freely in and out of the positive electrode.

Accordingly, in an aspect, disclosed is a positive electrode active material comprising a core and a coating disposed on at least a portion of a surface of the core.

The core is preferably in the form of a particle, which can have any suitable shape, without limitation, and can be rectilinear, curvilinear, or combination thereof. Core particles can be, for example, a spherical, oval, oval-spherical, and the like.

In an embodiment, the core comprises a lithium metal oxide, a lithium metal phosphate, or a combination thereof. For example, the core can comprise: Li$_a$A$_{1-b}$B'$_b$D$_2$ where 0.90≤a≤1 and 0≤b≤0.5; Li$_a$E$_{1-b}$B'$_b$O$_{2-c}$D$_c$ where 0.90≤a≤1, 0≤b≤0.5, and 0≤c≤0.05; LiE$_{2-b}$B'$_b$O$_{4-c}$D$_c$ where 0≤b≤0.5 and 0≤c≤0.05; Li$_a$Ni$_{1-b-c}$Co$_b$B'$_c$D$_\alpha$ where 0.90≤a≤1, 0≤b≤0.5, 0≤c≤0.05, and 0<α≤2; Li$_a$Ni$_{1-b-c}$Co$_b$B'$_c$O$_{2-\alpha}$F'$_\alpha$ where 0.90≤a≤1, 0≤b≤0.5, 0≤c≤0.05, and 0<α<2; Li$_a$Ni$_{1-b-c}$Co$_b$B'$_c$O$_{2-\alpha}$F'$_2$ where 0.90≤a≤1, 0≤b≤0.5, 0≤c≤0.05, and 0<α<2; Li$_a$Ni$_{1-b-c}$Mn$_b$B'$_c$D$_\alpha$ where 0.90≤a≤1, 0≤b≤0.5, 0≤c≤0.05, and 0<α<2; Li$_a$Ni$_{1-b-c}$Mn$_b$B'$_c$O$_{2-\alpha}$F' where 0.90≤a≤1, 0≤b≤0.5, 0≤c≤0.05, and 0<α<2; Li$_a$Ni$_{1-b-c}$Mn$_b$B'$_c$O$_{2-\alpha}$F'$_2$ where 0.90≤a≤1, 0≤b≤0.5, 0≤c≤0.05, and 0<α<2; Li$_a$Ni$_b$E$_c$G$_d$O$_2$ where 0.90≤a≤1, 0≤b≤0.9, 0≤c≤0.5, and 0.001≤d≤0.1; Li$_a$Ni$_b$Co$_c$Mn$_d$G$_e$O$_2$ where 0.90≤a≤1, 0≤b≤0.9, 0≤c≤0.5, 0≤d≤0.5, and 0.001≤e≤0.1; Li$_a$NiG$_b$O$_2$ where 0.90≤a≤1 and 0.001≤b≤0.1; Li$_a$CoG$_b$O$_2$ where 0.90≤a≤1 and 0.001≤b≤0.1; Li$_a$MnG$_b$O$_2$ where 0.90≤a≤1 and 0.001≤b≤0.1; Li$_a$Mn$_2$G$_b$O$_4$ where 0.90≤a≤1 and 0.001≤b≤0.1; QO$_2$; QS$_2$; LiQS$_2$; V$_2$O$_5$; LiV$_2$O$_5$; LiI'O$_2$; LiNiVO$_4$; Li$_{(3-f)}$J$_2$(PO$_4$)$_3$ where 0≤f≤2; Li$_{(3-f)}$Fe$_2$(PO$_4$)$_3$ where 0≤f≤2; and LiFePO$_4$. A combination comprising at least one of the foregoing can be used.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

In an embodiment, the core preferably comprises a material according to the formula

$$Li_xM_yO_z$$

wherein 0≤x≤3, 1≤y≤3, and 2≤z≤8; and M comprises an element of Group 2 to Group 13, or a combination thereof. For example, the core can comprise a lithium metal oxide of the formula Li$_x$Co$_{1-y}$M$_y$O$_{2-\alpha}$X$_\alpha$, Li$_x$Ni$_{1-y}$Me$_y$O$_{2-\alpha}$X$_\alpha$, Li$_x$Ni$_{1-y-z}$Mn$_y$Ma$_z$O$_{2-\alpha}$X$_\alpha$, or a combination thereof, wherein in the foregoing formulae, x, y, z, and α are each independently 0.90≤x≤1.1, 0≤y≤0.9, 0<z≤0.2, and 0≤α≤2; M comprises a metal and comprises Ni, Mn, Zr, Al, Mg, Ag, Mo, Ti, V, Cr, Fe, Cu, B, or a combination thereof, Me comprises a metal and comprises Co, Zr, Al, Mg, Ag, Mo, Ti, V, Cr, Mn, Fe, Cu, B, or a combination thereof, Ma comprises a metal and comprises Co, Zr, Al, Mg, Ag, Mo, Ti, V, Cr, Fe, Cu, B, or a combination thereof; and X comprises O, F, S, P, or a combination thereof. In an embodiment, M is Ni, Al, or a combination thereof, Me is Co, Al, or combination thereof, and Ma is Co, Al, or a combination thereof.

In an embodiment, the core can include a material of the formula Li$_x$Ni$_{1-y-z}$Mn$_y$Co$_z$O$_2$ wherein 0.90≤x≤1.1, 0≤y≤0.2, 0<z≤0.2, and 0.7≤1-y-z≤0.99. In a specific embodiment, the core comprises LiFePO$_4$, LiNiMnO$_2$, Li(Ni$_{1/3}$Mn$_{1/3}$Co$_{1/3}$)

$O_2$, or a combination thereof. In a specific embodiment, the core is $Li(Ni_{1/3}Mn_{1/3}Co_{1/3})O_2$.

The core can have an average diameter of 1 to 10 micrometers (μm), for example, 1 to 7 μm, or 1 to 5 μm, or 3 to 5 μm. As used herein, "average diameter" refers to a particle diameter that is obtained when the core particle is assumed to be a sphere. Also, the average particle diameter of the core is a particle diameter $D_{50}$, also known as the median particle diameter. Particle diameter can be measured, for example, using a laser diffraction scattering type particle size distribution measuring apparatus (e.g., a micro-track MT-3000II available from Nikkiso Co., Ltd.).

The positive electrode active material of the present disclosure comprises a coating disposed on at least a portion of a surface of the core. The coating comprises a compound according to Formula (I)

$$Li_m M^1_n X_p \qquad (I)$$

wherein in Formula (I), $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof and $0<m\le6$, $0\le n\le1$, and $0<p\le7$, provided that when n is 0, X is $B_7O_{12}$, $B_{11}O_{18}$, or $P(HO_2)_2$. In an embodiment, the coating comprises a compound according to Formula (I), wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $SeO_4$, $SeO_3$, $SbO_4$, $P_2O_7$, $P_3O_{10}$, $P_8O_{29}$, $PO_3$, $PO_4$, $SiO_4$, $SiO_3$, $Si_2O_5$, F, Cl, or a combination thereof and $0<m\le6$, $0\le n\le1$, and $0<p\le7$. In an embodiment, when $M^1$ in Formula (I) comprises Ba, Ca, Sc, or Sr, X is not $P_2O_7$, $P_3O_{10}$, $P_8O_{29}$, $PO_3$, or $PO_4$. In an embodiment, when $M^1$ in Formula (I) comprises Ba, Ca, Sc, or Sr, $M^1$ further comprises at least one of Al, Bi, Cd, Cr, Cs, Fe, Ga, Gd, Ge, Hf, In, K, La, Lu, Mg, Mo, Na, Rb, Sm, Sn, Y, Zr, or Zn.

In an embodiment, X in Formula (I) comprises $BO_2$, $B_3O_5$, $B_3O_{14}$, $B_7O_{12}$, $B_{11}O_{18}$, $P_2O_7$, $P_3O_{10}$, $P_8O_{29}$, $PO_3$, $PO_4$, F, Cl, or a combination thereof. In an embodiment, X comprises $BO_2$, $B_3O_5$, $B_3O_{14}$, $B_7O_{12}$, $B_{11}O_{18}$, $P_2O_7$, $P_3O_{10}$, $P_8O_{29}$, $PO_3$, $PO_4$, F, or a combination thereof.

In an embodiment, the coating comprises a compound according to Formula (I) wherein $M^1$ comprises Cs, Ba, Sr, Al, Gd, or a combination thereof, and X comprises $BO_2$, $B_3O_5$, $B_3O_{14}$, $B_7O_{12}$, $B_{11}O_{18}$, or a combination thereof. In an embodiment, the coating comprises a compound according to Formula (I) wherein $M^1$ comprises Cs, K, Ca, La, Bi, Gd, Sm, Sn, Ge, Sc, In, Mg, Ga, Zn, Al, Zr, or a combination thereof, and X comprises $P_2O_7$, $P_3O_{10}$, $P_8O_{29}$, $PO_3$, $PO_4$, or a combination thereof. In an embodiment, the coating comprises a compound according to Formula (I) wherein $M^1$ comprises Cs, Al, Na, Rb, Ca, Sr, K, Zr, Zn, Ba, Fe, Ga, Rb, Sc, Mo, Cr, Y, Sm, Gd, La, Bi, Hf, Ge, Cd, or a combination thereof, and X comprises F.

In a specific embodiment, the coating comprises $LiZnPO_4$, $LiLa(PO_3)_4$, $BaLi(B_3O_5)_3$, $SrLi(B_3O_5)_3$, $Li_3B_{11}O_{18}$, $Li_3B_7O_{12}$, $KNaLi_2(SeO_4)_2$, $LiGd_6B_3O_{14}$, $LiMgPO_4$, $Cs_2LiAl(PO_4)_2$, $Li_3MgZr(PO_4)_3$, $CsLi(B_3O_5)_2$, $LiCa_9Mg(PO_4)_7$, $LiScP_2O_7$, $Li_2Sn(PO_4)_2$, $LiMg_2P_3O_{10}$, $KLi_3Zr_2(Si_2O_5)_6$, $KLi(PO_3)_2$, $LiBi(PO_3)_4$, $LiSn_2(PO_4)_3$, $LiGe_2(PO_4)_3$, $CsLi(PO_3)_2$, $Li_2Al(BO_2)_5$, $LiGaP_2O_7$, $LiK_2AlF_6$, $LiBaZr_2F_{11}$, or a combination thereof.

In a very specific embodiment, the coating can comprise $LiZnPO_4$. In another specific embodiment, the coating can comprise $Li_3B_{11}O_{18}$, $Li_3B_7O_{12}$, or a combination thereof.

In another specific embodiment, the coating comprises $LiP(HO_2)_2$, which may also be written as $LiH_2PO_4$.

The presence of the coating on the surface of the core can be confirmed by, for example, microscopy, e.g., images from a field emission scanning electron microscope (FE-SEM) or a transmission electron microscope (TEM)), e.g., by analysis that uses a contrast difference caused by a difference in structures of the core and the coating.

The coating can have one or more advantageous properties. The coating having the above described composition can suppress undesirable side reactions from occurring between an element present on a surface of the cathode active material core and an element present on a surface of a solid electrolyte (e.g., a solid electrolyte particle). Furthermore, the presence of the coating disposed on the core can improve the output of a lithium-ion battery. Furthermore, in an embodiment, the coating can have a lithium ion conductivity of $10^{-8}$ to $10^0$ siemens per centimeter (S/cm), as determined at 25° C. In an embodiment, the coating can have an electronic conductivity of less than $10^{-8}$ S/cm as determined at 25° C. In an embodiment, the coating can have a band gap of greater than 1 electron volt (eV). In an embodiment, the coating can have a reaction energy for decomposition of greater than −120 millielectron volts per atom (meV/atom). The coating can have at least one of the aforementioned properties. For example, the coating can have two, or three, or four of the aforementioned properties.

The coating can have a thickness of 1 to 100 nanometers (nm), for example 1 to 80 nm, or 1 to 50 nm, or 5 to 30 nm. When the thickness of the coating is within the above range, the characteristics of the positive electrode active material can be enhanced without a decrease in lithium ion conductivity. When the thickness of the coating is less than 1 nm, it can be difficult to sufficiently suppress the reaction between the core particles and the solid electrolyte. In addition, when the thickness of the coating is greater than 50 nm, electron conductivity between the core particles and the conductive agent can be reduced.

The thickness of the coating can be determined, for example, using a cross-sectional image taken by a transmission electron microscope (TEM).

The positive electrode active material described herein can be manufactured by a method comprising combining a lithium precursor, a metal precursor, a solvent, and at least one of a phosphorous oxide, a borate, a fluoride, or a chloride to form a mixture. The method further comprises contacting the mixture with a core comprising a lithium metal oxide, a lithium metal phosphate, or a combination thereof. The mixture and the core can be heated to obtain a positive electrode active material precursor comprising a coating precursor on at least a portion of a surface of the core. The heating can be at a temperature of 120 to 500° C. and for a time of 30 minutes to 5 hours. The method can further include calcining the core particles prior to contacting the core with the mixture. The temperature for the calcining process can be, for example, 600 to 1100° C. A period of time for the calcining process is not particularly limited but may be, for example, in a range of about 1 hour to about 12 hours.

The positive electrode active material described herein can be particularly useful in an electrochemical cell. Thus, another aspect of the present disclosure is an electrochemical cell comprising the positive electrode active material described herein. The electrochemical cell can be fabricated in any suitable shape, and can be prismatic or cylindrical, and can have a wound or stacked configuration. The shape of the electrochemical cell is not limited to the above mentioned shapes, and can be shaped in various forms other than the foregoing.

The electrochemical cell of the present disclosure comprises a positive electrode comprising the positive electrode active material described above, a negative electrode, and an electrolyte between the positive electrode and the negative electrode. In an embodiment, the electrochemical cell can further comprise a separator disposed between the positive electrode and the negative electrode.

The positive electrode can be formed by forming a layer comprising the positive electrode active material on a current collector. For example, a positive electrode mixture can be prepared by adding solid electrolyte particles and a solvent to the positive electrode active material comprising the core and the coating on at least a portion of the surface of the core, and the positive electrode mixture can be coated and dried on a current collector to provide the positive electrode. The solvent can generally be any solvent and is not particularly limited as long as it can be used in preparation of a positive electrode mixture. The solvent can be a non-polar solvent. The non-polar solvent does not easily react with a solid electrolyte particle. Subsequently, the positive electrode mixture thus prepared is coated and dried on a current collector by using, for example, a doctor blade. Then, the current collector and a layer of the cathode mixture can be compressed by using a roll-press to prepare the positive electrode layer.

The positive electrode layer can include additives, for example, a conducting agent, a binding agent, an electrolyte, a filler, a dispersing agent, and an ion conducting agent, which can be appropriately selected and combined, in addition to positive electrode active material comprising the core and the coating, as described above.

The conducting agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conducting agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used. In an embodiment, the conducting agent can include graphite, carbon black, acetylene black, ketjen black, carbon fibers, and a metal powder.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The positive electrode can further comprise an electrolyte. When present, the electrolyte can preferably be a solid electrolyte and can comprise a ceramic, glass ceramic, or polymer. The solid electrolyte can be of the same composition as the electrolyte in the separator, or it can be selected to be more electrochemically stable with the positive or negative active material. Examples of the electrolyte can include a sulfide-based solid electrolyte, which will be described in detail below. Also, the filler, the dispersing agent, and the ion conducting agent can be selected from commercially available materials for the manufacture of an electrode of an electrochemical cell.

The negative electrode can be produced from a negative active material composition including a negative active material, and optionally, a conductive agent, and a binder. The negative active materials that can be used in the electrochemical cell include materials capable of storing and releasing lithium ions electrochemically. Such negative electrode active material can be a well-known negative electrode active material for lithium-ion batteries such as hard carbon, soft carbon, carbon black, ketjen black, acetylene black, activated carbon, carbon nanotubes, carbon fiber, amorphous carbon, and other carbon materials. Also usable are lithium-containing metals and alloys, wherein the metal can be any suitable metal, e.g., Si, Sn, Sb, Ge. Lithium-containing metal oxides, metal nitrides, and metal sulfides are also useful, in particular wherein metal can be Ti, Mo, Sn, Fe, Sb, Co, V. Also useable are phosphorous (P) or metal doped phosphorous (e.g., $NiP_3$). The negative active material is not limited to the foregoing and any suitable negative active material can be used. The negative electrode can be produced by a method similar to that used to obtain the positive electrode.

In an embodiment, the negative electrode comprises graphite. In an embodiment, the negative electrode comprises lithium metal.

As the separator, when present, a porous olefin film such as polyethylene and polypropylene, and polymer electrolyte can be used. The separator can be porous, and a diameter of a pore of the separator can be in a range of about 0.01 to about 10 micrometers (m), and a thickness of the separator can be in a range of about 5 to about 300 m. In greater detail, the separator can be a woven or a non-woven fabric comprising an olefin-based polymer such as polypropylene or polyethylene; or a glass fiber.

The electrolyte disposed between the positive electrode and the negative electrode is preferably a solid electrolyte. In an embodiment, the solid electrolyte can be a sulfide solid electrolyte, for example lithium sulfide, silicon sulfide, phosphorus sulfide, boron sulfide, or a combination thereof. The sulfide-based solid electrolyte particle can comprise $Li_2S$, $P_2S_5$, $SiS_2$, $GeS_2$, $B_2S_3$, or a combination thereof. The sulfide-based solid electrolyte particle can be $Li_2S$ or $P_2S_5$. The sulfide-based solid electrolyte particle is known for its high lithium ion conductivity compared to that of other inorganic compounds. In a preferred embodiment, the solid electrolyte comprises $Li_2S$ and $P_2S_5$. When the sulfide solid electrolyte material constituting the solid electrolyte includes $Li_2S$—$P_2S_5$, a mixing molar ratio of $Li_2S$ to $P_2S_5$ can range, for example, from about 50:50 to about 90:10.

In addition, an inorganic solid electrolyte prepared by adding $Li_3PO_4$, a halogen, a halogen compound, $Li_{2+2x}$ $Zn_{1-x}GeO_4$ ("LISICON"), $Li_{3+y}PO_{4-x}N_x$ ("LIPON"), $Li_{3.25}Ge_{0.25}P_{0.75}S_4$("Thio-LISICON"), $Li_2O$—$Al_2O_3$—$TiO_2$—$P_2O_5$("LATP"), or the like to an inorganic solid electrolyte of $Li_2S$—$P_2S_5$, $SiS_2$, $GeS_2$, $B_2S_3$, or a combination thereof can be used as a sulfide solid electrolyte. Non-limiting examples of the sulfide solid electrolyte material include $Li_2S$—$P_2S_5$; $Li_2S$—$P_2S_5$—LiX where X is a halogen element; $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—ZmSn where m and n are positive numbers, and Z is Ge, Zn, or G; $Li_2S$—$GeS_2$; $Li_2SiS_2$—$Li_3PO_4$; and $Li_2S$—$SiS_2$—$Li_pMO_q$ where p and q are positive numbers, and M is P, Si, Ge, B, Al, Ga, or In. In this regard, the sulfide-based solid electrolyte material is prepared by treating a raw starting material (e.g., $Li_2S$, $P_2S_5$, or the like) of a sulfide-based solid electrolyte material by a melt quenching method, a mechanical milling method, or the like. In addition, a calcination process may be performed after treatment.

The solid electrolyte can be in the form of a particle, and can have, for example, a spherical form, an oval-spherical form, or the like. The particle diameter of the solid electrolyte is not particularly limited, and the solid electrolyte can have a mean particle diameter ranging, for example, from about 0.01 to about 30 μm, for example, about 0.1 to about 20 μm. As described above, the mean particle diameter refers to a number average diameter ($D_{50}$) of the particle size distribution of particles obtained by scattering, or the like.

The solid electrolyte can be prepared, for example, by melt quenching or mechanical milling. For example, when melt quenching is used, $Li_2S$ and $P_2S_5$ can be mixed in certain amounts to prepare a pellet form, and the prepared pellet form can be allowed to react in a vacuum state at a predetermined reaction temperature, followed by quenching, thereby completing the preparation of the sulfide-based solid electrolyte material. In addition, the reaction temperature of the mixture of $Li_2S$ and $P_2S_5$ ranges from, for example, about 200 to about 800° C., for example, about 300 to about 600° C. In addition, reaction time can range from, for example, about 0.1 to about 24 hours, for example, about 1 to about 12 hours. In addition, a quenching temperature of the reaction product can be about 10° C. or less, for example, about 0° C. or less, and a quenching rate of the reaction product can range from about 1° C./second (sec) to about 10,000° C./sec, for example, about 1° C./sec to about 1,000° C./sec.

In addition, when mechanical milling is used, $Li_2S$ and $P_2S_5$ can be mixed in certain amounts and allowed to react while stirred using a ball mill or the like, thereby preparing a sulfide-based solid electrolyte material. In addition, a stirring rate and stirring time of the mechanical milling method are not particularly limited, but the faster the stirring rate, the faster the production rate of the sulfide-based solid electrolyte material, and the longer the stirring time, the greater the conversion rate of raw materials into the sulfide-based solid electrolyte material.

Thereafter, the sulfide-based solid electrolyte material obtained by melt quenching or mechanical milling can be heat-treated at a predetermined temperature and then pulverized, thereby preparing the solid electrolyte having a particle shape.

Subsequently, the solid electrolyte obtained using the method can be deposited using a film formation method, for example, by blasting, aerosol deposition, cold spraying, sputtering, chemical vapor deposition ("CVD"), spraying, or the like, thereby preparing a solid electrolyte layer. In addition, the solid electrolyte layer can be formed by pressing the solid electrolyte. In addition, the solid electrolyte layer can be formed by mixing the solid electrolyte, a solvent, and a binder or a support and pressing the resulting mixture. In this case, the solvent or the support is added to reinforce the strength of the solid electrolyte layer or prevent short-circuit of the solid electrolyte.

The electrochemical cell can be manufactured by providing a positive electrode, providing a negative electrode, and disposing an electrolyte between the positive electrode and the negative electrode to manufacture the electrochemical cell. For example, the positive electrode, the negative electrode, and the solid electrolyte, which have been formed using the above-described methods, can be stacked such that the solid electrolyte layer is disposed between the positive electrode and the negative electrode, and the resulting structure can be pressed to provide the electrochemical cell.

When the electrochemical cell further comprises a separator, the method can further comprise disposing a separator between the positive electrode and the negative electrode.

This disclosure is further illustrated by the following examples, which are non-limiting.

EXAMPLES

The use of $LiZnPO_4$ (LZP) as a coating material on a $LiNi_{0.5}Co_{0.2}Mn_{0.3}O_2$(NCM) positive electrode material was demonstrated in the following examples. The coated positive electrode active material was prepared by the sol-gel method. The LZP coating sol was prepared from lithium methoxide in methanol solution, and zinc acetate and $P_2O_5$ powder in stoichiometric mixture were dissolved in ethanol. NCM ($D_{50}$ about 5 μm) was dispersed into the above solution and stirred for 1 hour, and the propanol evaporated under vacuum at 60° C. (using a water bath) while undergoing ultrasonic wave irradiation in order to prevent the NCM particles from aggregating. After filtration, the precursor was heated at 350° C. for 1 hour under air, and the LZP coated NCM was provided.

To demonstrate the utility of the coating, the performance of two battery cells was compared. In a first (comparative) example, an uncoated $Li(Ni_{1/3}Mn_{1/3}Co_{1/3})O_2$ positive electrode in contact with an $Li_2S$—$P_2S_5$(70:30) electrolyte with a graphite negative electrode was used. In an example according to the present disclosure, a LZP-coated $Li(Ni_{1/3}Mn_{1/3}Co_{1/3})O_2$ cathode in contact with an $Li_2S$—$P_2S_5$(70:30) electrolyte with a graphite negative electrode was used. The cell configuration used was graphite/$Li_2S$—$P_2S_5$/positive electrode.

Figure 2B:
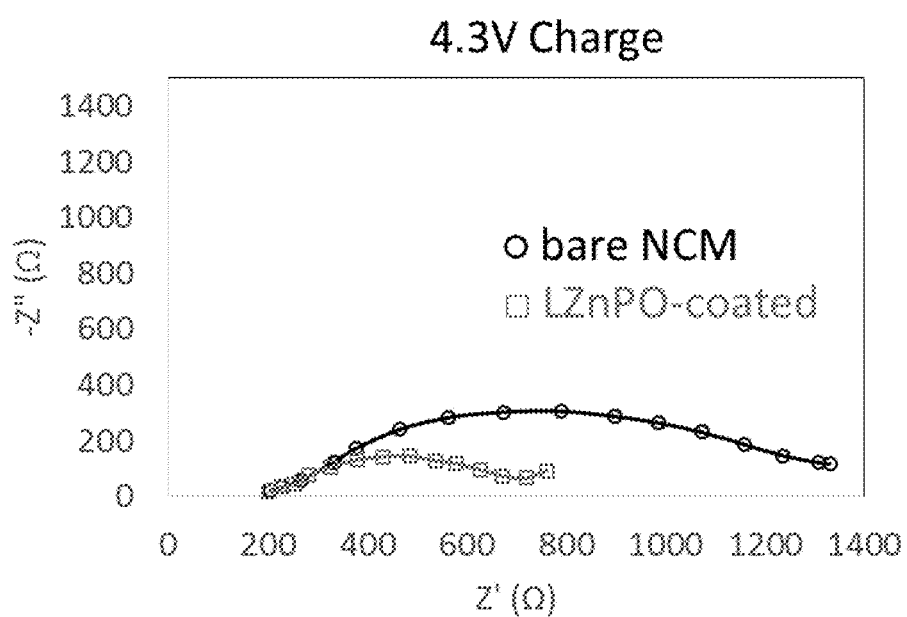
FIG. 2B is a graph of imaginary resistance (Z", ohms (Ω)) versus real resistance (Z', Ω), which shows an electrochemical impedance spectrum obtained after charging to 4.3 volts on a first charge an electrochemical cell having a positive electrode active material coated with LiZnPO$_4$ and an electrochemical cell having an uncoated positive electrode active material.

FIGS. 2A and 2B show the performance of the two cells. FIG. 2B shows that the interfacial resistance is lower in the coated cathode (FIG. 2B) and the coated cathode provides better rate performance (FIG. 2A), suggesting that the reactions between the electrolyte and electrode are suppressed. These results are validation of the model results.

In a further example, the use of $Li_3B_{11}O_{18}$ (LBO) was also demonstrated. Ionic conductivity in a solid inorganic material occurs via activated diffusion. The energy barrier is a measure of the likelihood of diffusion events occurring, and the lower the energy barrier the more events will occur, and the better the material is as an ionic conductor. Using density functional theory calculations (DFT) and the nudged elastic band method (NEB), one can determine the energy barrier. Implemented in VASP, the results are shown FIGS. 3A and 3B. This material has a relatively low activation barrier (~0.8 eV) and is thus considered an ionic conductor.

Figure 4A:
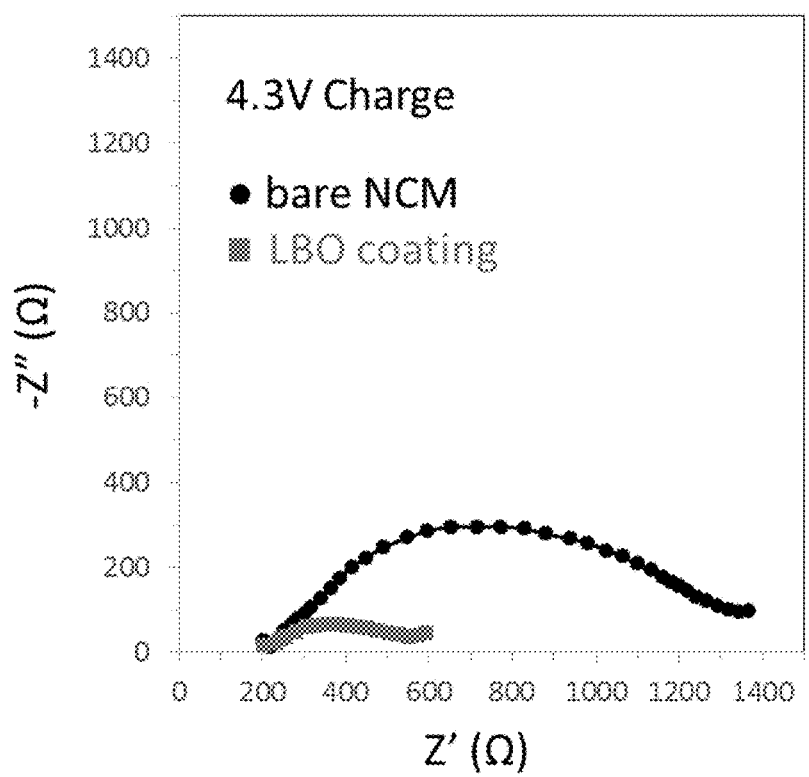
FIG. 4A is a graph of imaginary resistance (Z", ohms (Ω)) versus real resistance (Z', Ω), which shows an electrochemical impedance spectrum obtained after a 4.3 volt first charge for an electrochemical cell having a positive electrode active material coated with Li$_3$B$_{11}$O$_{18}$, and an electrochemical cell having uncoated positive electrode active material.
Figure 4B:
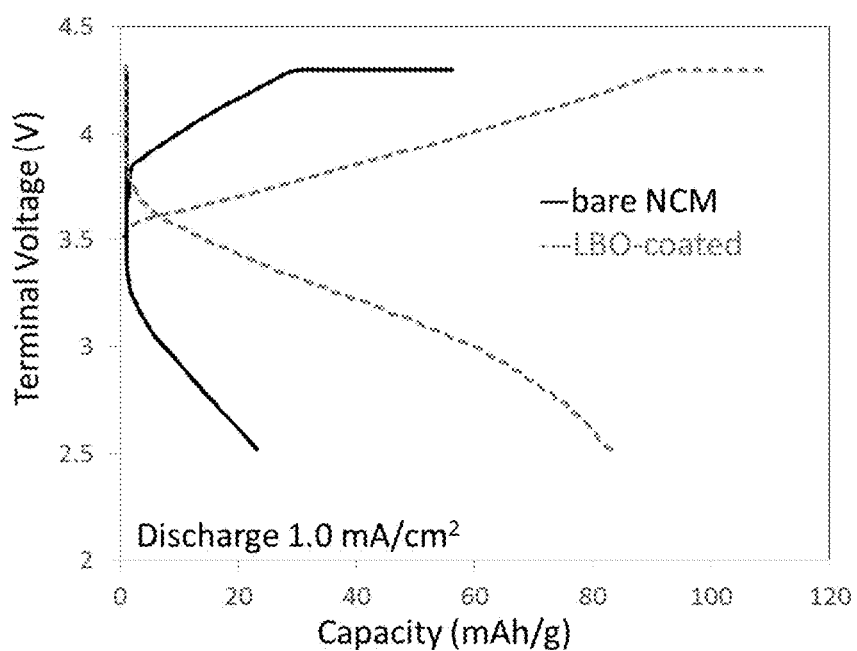
FIG. 4B is as graph of terminal voltage (volts, V) versus discharge capacity (mAh/g) shows the voltage vs. capacity for an electrochemical cell comprising a positive electrode active material coated with Li$_3$B$_{11}$O$_{18}$ and an electrochemical cell having an uncoated positive electrode active material.

To demonstrate the use of this material as a coating, a full cell was constructed using Graphite/Li$_2$S—P$_2$S$_5$/Li$_3$B$_{11}$O$_{18}$-coated LiNi$_{0.5}$Co$_{0.2}$Mn$_{0.3}$O$_2$ (LBO-coated NCM523). The improved rate performance of and lowered impedance is shown in FIGS. 4A and 4B. As shown in FIG. 4A, the resistance with the coating was about 600Ω, compared to about 1300Ω without the coating. The coating was applied using a similar technique as described for LiZnPO$_4$ (LZPO) except the appropriate borate precursor, such as boric acid, was used in a stoichiometric amount.

Figure 3A:
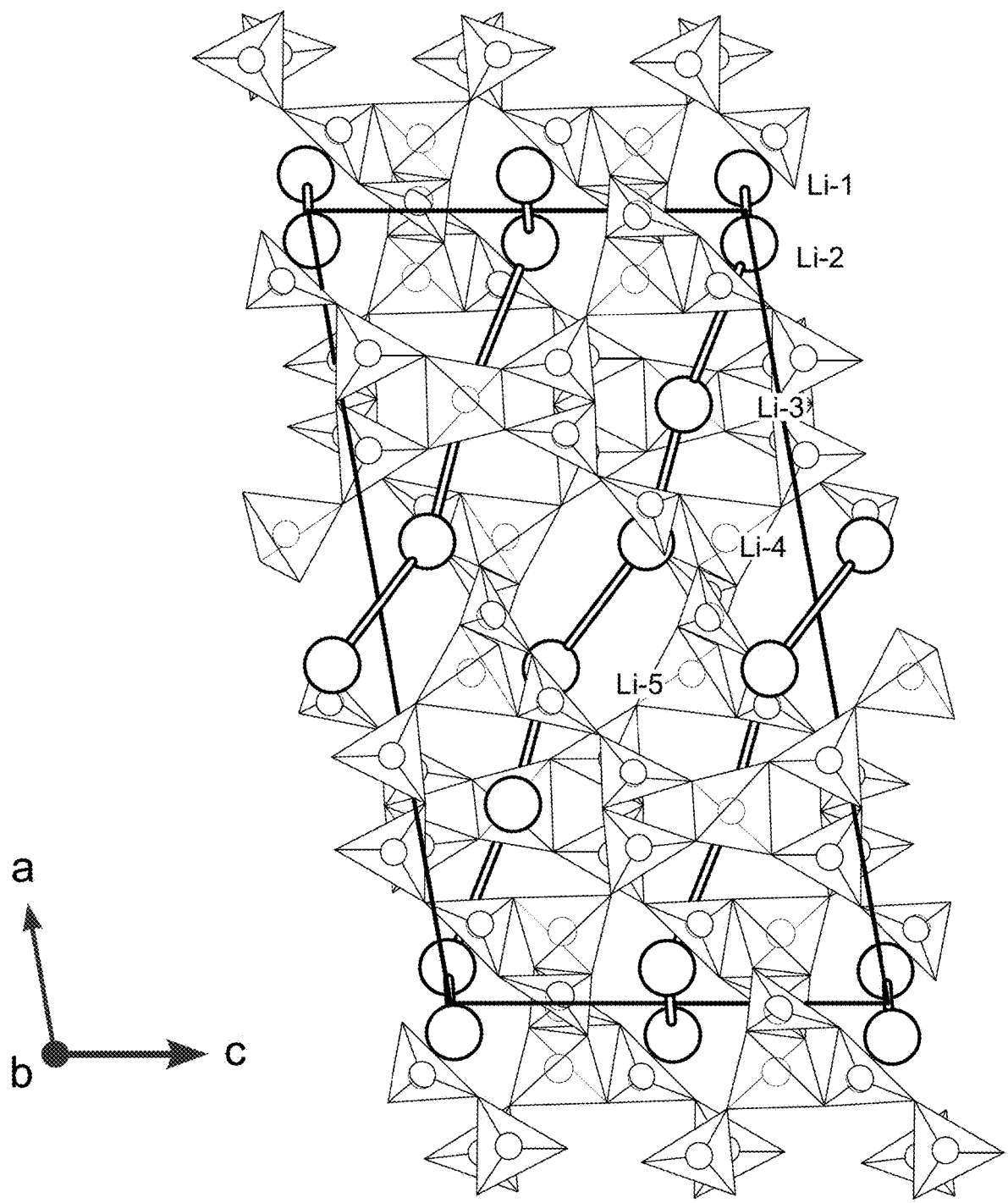
FIG. 3A shows an embodiment of the structure of Li$_3$B$_{11}$O$_{18}$.
Figure 3B:
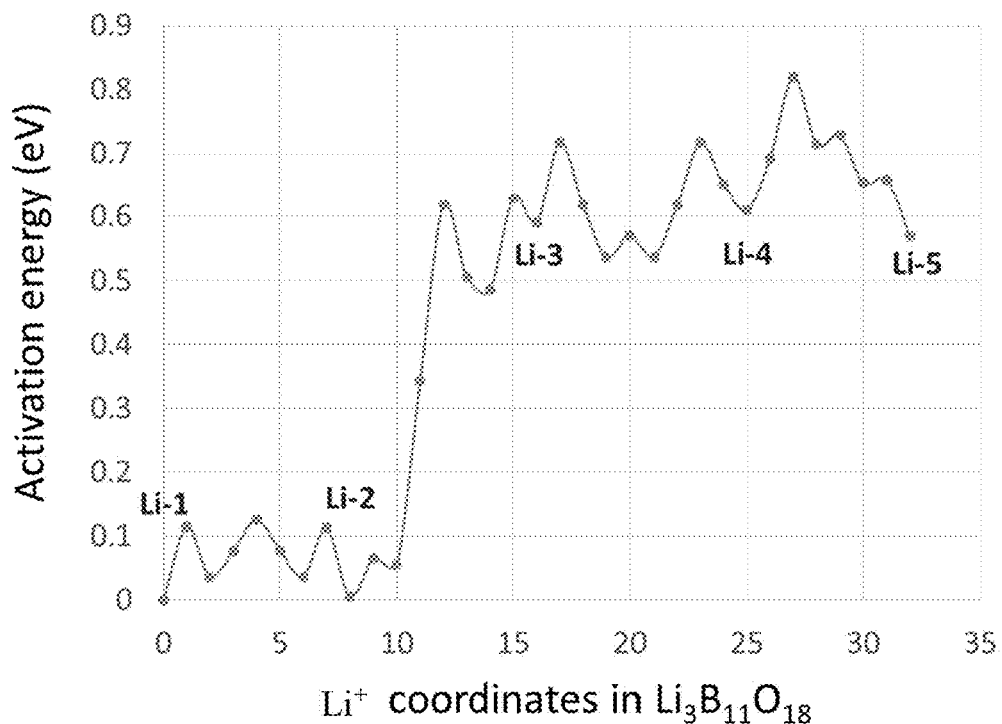
FIG. 3B is a graph of activation energy (electron volts, eV) versus Li$^+$ coordinate in Li$_3$B$_{11}$O$_{18}$, which shows the results of Nudged Elastic Band calculations for Li$_3$B$_{11}$O$_{18}$.

As shown in FIG. 3A, the structure of Li$_3$B$_{11}$O$_{18}$ is built upon a 3D framework of BO$_3$ triangular units and BO$_4$ tetrahedra linked through vertices. As shown in FIG. 3B, the NEB (Nudged Elastic Band) calculation indicates that Li$_3$B$_{11}$O$_{18}$ has relatively low activation energy (~0.8 eV). FIG. 4A shows that Li$_3$B$_{11}$O$_{18}$ has extremely low impedance, and FIG. 4B shows that Li$_3$B$_{11}$O$_{18}$ has good rate capability, with both being better than the corresponding uncoated materials.

This disclosure further encompasses the following embodiments, which are non-limiting.

Embodiment 1

A positive electrode active material comprising a core comprising a lithium metal oxide, a lithium metal phosphate, or a combination thereof, and a coating disposed on at least a portion of a surface of the core, wherein the coating comprises a compound according to Formula (I)

$$Li_m M^1_n X_p \qquad (I)$$

wherein M$^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises BO$_2$, B$_3$O$_5$, B$_3$O$_{14}$, B$_7$O$_{12}$, B$_{11}$O$_{18}$, SeO$_4$, SeO$_3$, SbO$_4$, P$_2$O$_7$, P$_3$O$_{10}$, P$_8$O$_{29}$, PO$_3$, PO$_4$, P(HO$_2$)$_2$, SiO$_4$, SiO$_3$, Si$_2$O$_5$, F, Cl, or a combination thereof and 0<m≤6, 0≤n≤1, and 0<p≤7, provided that when n is 0, X is B$_7$O$_{12}$, B$_{11}$O$_{18}$, or P(HO$_2$)$_2$.

Embodiment 1a

A positive electrode active material comprising a core comprising a lithium metal oxide, a lithium metal phosphate, or a combination thereof, and a coating disposed on at least a portion of a surface of the core, wherein the coating comprises LiP(HO$_2$)$_2$.

Embodiment 2

The positive electrode active material of embodiment 1, wherein the core comprises LiFePO$_4$, LiNiMnO$_2$, Li(Ni$_{1/3}$Mn$_{1/3}$Co$_{1/3}$)O$_2$, or a combination thereof.

Embodiment 3

The positive electrode active material of embodiment 1 or 2, wherein X comprises BO$_2$, B$_3$O$_5$, B$_3$O$_{14}$, B$_7$O$_{12}$, B$_{11}$O$_{18}$, P$_2$O$_7$, P$_3$O$_{10}$, P$_8$O$_{29}$, PO$_3$, PO$_4$, F, Cl, or a combination thereof.

Embodiment 4

The positive electrode active material of any of embodiments 1 to 3, wherein X comprises BO$_2$, B$_3$O$_5$, B$_3$O$_{14}$, B$_7$O$_{12}$, B$_{11}$O$_{18}$, P$_2$O$_7$, P$_3$O$_{10}$, P$_8$O$_{29}$, PO$_3$, PO$_4$, F, or a combination thereof.

Embodiment 5

The positive electrode active material of any of embodiments 1 to 4, wherein M$^1$ comprises Cs, Ba, Sr, Al, Gd, or a combination thereof, and X comprises BO$_2$, B$_3$O$_5$, B$_3$O$_{14}$, B$_7$O$_{12}$, B$_{11}$O$_{18}$, or a combination thereof.

Embodiment 6

The positive electrode active material of any of embodiments 1 to 4, wherein M$^1$ comprises Cs, K, Ca, La, Bi, Gd, Sm, Sn, Ge, Sc, In, Mg, Ga, Zn, Al, Zr, or a combination thereof, and X comprises P$_2$O$_7$, P$_3$O$_{10}$, P$_8$O$_{29}$, PO$_3$, PO$_4$, or a combination thereof.

Embodiment 7

The positive electrode active material of any of embodiments 1 to 4, wherein M$^1$ comprises Cs, Al, Na, Rb, Ca, Sr, K, Zr, Zn, Ba, Fe, Ga, Rb, Sc, Mo, Cr, Y, Sm, Gd, La, Bi, Hf, Ge, Cd, or a combination thereof, and X comprises F.

Embodiment 8

The positive electrode active material of embodiment 1 or 2, wherein the coating comprises LiZnPO$_4$, LiLa(PO$_3$)$_4$, BaLi(B$_3$O$_5$)$_3$, SrLi(B$_3$O$_5$)$_3$, Li$_3$B$_{11}$O$_{18}$, Li$_3$B$_7$O$_{12}$, KNaLi$_2$(SeO$_4$)$_2$, LiGd$_6$B$_3$O$_{14}$, LiMgPO$_4$, Cs$_2$LiAl(PO$_4$)$_2$, Li$_3$MgZr(PO$_4$)$_3$, CsLi(B$_3$O$_5$)$_2$, LiCa$_9$Mg(PO$_4$)$_7$, LiScP$_2$O$_7$, Li$_2$Sn(PO$_4$)$_2$, LiMg$_2$P$_3$O$_{10}$, KLi$_3$Zr$_2$(Si$_2$O$_5$)$_6$, KLi(PO$_3$)$_2$, LiBi(PO$_3$)$_4$, LiSn$_2$(PO$_4$)$_3$, LiGe$_2$(PO$_4$)$_3$, CsLi(PO$_3$)$_2$, Li$_2$Al(BO$_2$)$_5$, LiGaP$_2$O$_7$, LiK$_2$AlF$_6$, LiBaZr$_2$F$_{11}$, or a combination thereof.

Embodiment 9

The positive electrode active material of any of embodiments 1 to 8, wherein the coating has one or more of a lithium ion conductivity of 10$^{-8}$ to 10$^0$ S/cm at 25° C., an electronic conductivity of less than 10$^{-8}$ S/cm at 25° C., a band gap of greater than 1 eV, and a reaction energy for decomposition of greater than −120 meV/atom.

Embodiment 10

The positive electrode active material of any of embodiments 1 to 9, wherein the coating has a thickness of 1 to 100 nanometers.

Embodiment 11

The positive electrode active material of any of embodiments 1, 2, or 8-10, wherein the coating comprises LiZnPO$_4$.

Embodiment 12

The positive electrode active material of any of embodiments 1, 2 or 8-10, wherein the coating comprises Li$_3$B$_{11}$O$_{18}$, Li$_3$B$_7$O$_{12}$, or a combination thereof.

Embodiment 13

A method for the manufacture of a positive electrode active material, the method comprising: combining a lithium precursor, a metal precursor, a solvent, and at least one of a phosphorous oxide, a borate, a fluoride, and a chloride, to form a mixture, contacting the mixture with a core comprising a lithium metal oxide, a lithium metal phosphate, or a combination thereof, and heating the mixture and the core to obtain a positive electrode active material precursor comprising a coating precursor on at least a portion of a surface of the core.

Embodiment 14

An electrochemical cell comprising a positive electrode comprising a positive electrode active material comprising a core comprising a lithium metal oxide, a lithium metal phosphate, or a combination thereof, and a coating disposed on at least a portion of a surface of the core, wherein the coating comprises a compound according to Formula (I)

$$Li_m M^1_n X_p \quad (I)$$

wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof, and $0<m\le 6$, $0\le n\le 1$, and $0<p\le 7$; provided that when n is 0, X is $B_7O_{12}$, $B_{11}O_{18}$, or $P(HO_2)_2$, a negative electrode; and an electrolyte between the positive electrode and the negative electrode.

Embodiment 14a

An electrochemical cell comprising a positive electrode comprising a positive electrode active material comprising a core comprising a lithium metal oxide, a lithium metal phosphate, or a combination thereof, and a coating disposed on at least a portion of a surface of the core, wherein the coating comprises $LiP(HO_2)_2$; a negative electrode; and an electrolyte between the positive electrode and the negative electrode.

Embodiment 15

The electrochemical cell of embodiment 14, further comprising a separator disposed between the positive electrode and the negative electrode.

Embodiment 16

The electrochemical cell of embodiment 14 or 15, wherein the negative electrode comprises graphite.

Embodiment 17

The electrochemical cell of embodiments 14 or 15, wherein the negative electrode comprises lithium metal.

Embodiment 18

The electrochemical cell of any of embodiments 14 to 17, wherein the electrolyte is a solid electrolyte.

Embodiment 19

The electrochemical cell of embodiment 18, wherein the solid electrolyte is a sulfide solid electrolyte.

Embodiment 20

The electrochemical cell of embodiment 19, wherein the sulfide solid electrolyte comprises $Li_2S$ and $P_2S_5$.

Embodiment 21

A method for the manufacture of an electrochemical cell, the method comprising: providing a positive electrode comprising a positive electrode active material comprising a core comprising a lithium metal oxide, a lithium metal phosphate, or a combination thereof, and a coating disposed on at least a portion of a surface of the core, wherein the coating comprises a compound according to Formula (I)

$$Li_m M^1_n X_p \quad (I)$$

wherein $M^1$ comprises Al, Ba, Bi, Ca, Cd, Cr, Cs, Fe, Ga, Gd, Ge, Hf, In, K, La, Lu, Mg, Mo, Na, Rb, Sc, Sm, Sn, Sr, Y, Zr, Zn, or a combination thereof, X comprises $BO_2$, $B_3O_5$, $B_3O_{14}$, $B_7O_{12}$, $B_{11}O_{18}$, $SeO_4$, $SeO_3$, $SbO_4$, $P_2O_7$, $P_3O_{10}$, $P_8O_{29}$, $PO_3$, $PO_4$, $P(HO_2)_2$, $SiO_4$, $SiO_3$, $Si_2O_5$, F, Cl, or a combination thereof, and $0<m\le 6$, $0\le n\le 1$, and $0<p\le 7$, provided that when n is 0, X is $B_7O_{12}$, $B_{11}O_{18}$, or $P(HO_2)_2$, providing a negative electrode, and disposing an electrolyte between the positive electrode and the negative electrode to manufacture the electrochemical cell.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A positive electrode active material comprising
 a core comprising a lithium metal oxide, a lithium metal phosphate, or a combination thereof, and a coating disposed directly on at least a portion of a surface of the core, wherein the coating comprises
a compound according to Formula (I)

$$Li_mZn_n(PO_4)_p \qquad (I);$$

$$Li_3B_{11}O_{18};$$

or a combination thereof;
wherein
$0<m\leq6$, $0<n\leq1$, and $0<p\leq7$;
wherein the coating has a thickness of 1 to 100 nanometers; and
wherein a cell comprising the positive electrode active material has an interfacial resistance that is less than an interfacial resistance of a cell comprising the same positive electrode active material without the coating.

2. The positive electrode active material of claim 1, wherein the core comprises $LiFePO_4$, $LiNiMnO_2$, $Li(Ni_{1/3}Mn_{1/3}Co_{1/3})O_2$, or a combination thereof.

3. The positive electrode active material of claim 1, wherein the coating has
a lithium ion conductivity of $10^{-8}$ to $10^0$ S/cm at 25° C.

4. The positive electrode active material of claim 1, wherein the coating has a thickness of 1 to 50 nanometers.

5. The positive electrode active material of claim 1, wherein the coating comprises $LiZnPO_4$.

6. The positive electrode active material of claim 1, wherein the coating comprises $Li_3B_{11}O_{18}$.

7. A method for the manufacture of an electrochemical cell, the method comprising:
providing a positive electrode comprising the positive electrode active material of claim 1,
providing a negative electrode, and
disposing an electrolyte between the positive electrode and the negative electrode to manufacture the electrochemical cell;
wherein the electrochemical cell has an interfacial resistance that is less than an interfacial resistance of an electrochemical cell comprising the same positive electrode active material without the coating.

8. An electrochemical cell comprising
a positive electrode comprising a positive electrode active material comprising
a core comprising a lithium metal oxide, a lithium metal phosphate, or a combination thereof, and
a coating disposed on at least a portion of a surface of the core, wherein the coating comprises
a compound according to Formula (I)

$$Li_mZn''(PO_4)_p \qquad (I);$$

$$Li_3B_{11}O_{18};$$

or a combination thereof;
wherein
$0<m\leq6$, $0<n\leq1$, and $0<p\leq7$;
wherein the coating has a thickness of 1 to 100 nanometers;
a negative electrode; and
an electrolyte between the positive electrode and the negative electrode;
wherein the electrochemical cell has an interfacial resistance that is less than an interfacial resistance of an electrochemical cell comprising the same positive electrode active material without the coating.

9. The electrochemical cell of claim 8, further comprising a separator disposed between the positive electrode and the negative electrode.

10. The electrochemical cell of claim 8, wherein the negative electrode comprises graphite.

11. The electrochemical cell of claim 8, wherein the negative electrode comprises lithium metal.

12. The electrochemical cell of claim 8, wherein the electrolyte is a solid electrolyte.

13. The electrochemical cell of claim 12, wherein the solid electrolyte is a sulfide solid electrolyte.

14. The electrochemical cell of claim 13, wherein the sulfide solid electrolyte comprises $Li_2S$ and $P_2S_5$.

* * * * *